(12) United States Patent
Richardson (10) Patent No.: US 12,522,688 B2
(45) Date of Patent: Jan. 13, 2026

(54) PULTRUSION WITH EXTRUDED GASKET FOAM

(71) Applicant: Zephyros, Inc., Romeo, MI (US)

(72) Inventor: Henry E. Richardson, Washington, MI (US)

(73) Assignee: Zephyros, Inc., Romeo, MI (US)

( * ) Notice: Subject to any disclaimer, the term of this patent is extended or adjusted under 35 U.S.C. 154(b) by 857 days.

(21) Appl. No.: 17/431,886

(22) PCT Filed: Mar. 23, 2020

(86) PCT No.: PCT/US2020/024211
§ 371 (c)(1),
(2) Date: Aug. 18, 2021

(87) PCT Pub. No.: WO2020/198139
PCT Pub. Date: Oct. 1, 2020

(65) Prior Publication Data
US 2022/0145000 A1    May 12, 2022

Related U.S. Application Data (60) Provisional application No. 62/824,046, filed on Mar. 26, 2019.

(51) Int. Cl.
| | |
|---|---|
| *C08G 59/38* | (2006.01) |
| *B29C 44/12* | (2006.01) |
| *B29C 69/02* | (2006.01) |
| *B29C 70/52* | (2006.01) |
| *B29C 70/74* | (2006.01) |
| *C08G 59/26* | (2006.01) |
| *C08G 59/40* | (2006.01) |
| *C09K 3/10* | (2006.01) |
| *B29K 63/00* | (2006.01) |
| *B29K 105/04* | (2006.01) |
| *B29L 31/00* | (2006.01) |
| *B29L 31/26* | (2006.01) |

(52) U.S. Cl.
CPC .......... *C08G 59/38* (2013.01); *B29C 44/1271* (2013.01); *B29C 69/02* (2013.01); *B29C 70/52* (2013.01); *B29C 70/747* (2013.01); *C08G 59/26* (2013.01); *C08G 59/4071* (2013.01); *C09K 3/10* (2013.01); *B29K 2063/00* (2013.01); *B29K 2105/04* (2013.01); *B29L 2031/003* (2013.01); *B29L 2031/265* (2013.01); *C09K 2200/0647* (2013.01)

(58) Field of Classification Search
CPC .... C08G 59/38; C08G 59/26; C08G 59/4071; B29C 44/1271; B29C 69/02; B29C 70/52; B29C 70/747; C09K 3/10; C09K 2200/0647; B29K 2063/00; B29K 2105/04; B29L 2031/003; B29L 2031/265
See application file for complete search history.

(56) References Cited

U.S. PATENT DOCUMENTS

| | | | | |
|---|---|---|---|---|
| 5,648,401 A | * | 7/1997 | Czaplicki | .................. C08J 9/08 |
| | | | | 521/85 |
| 6,468,613 B1 | * | 10/2002 | Kitano | .................... B32B 15/20 |
| | | | | 428/113 |
| 10,570,258 B2 | | 2/2020 | Richardson et al. | |
| 11,110,670 B2 | | 9/2021 | Richardson et al. | |
| 2011/0067918 A1 | * | 3/2011 | Whu | .................... H05K 9/0075 |
| | | | | 174/388 |
| 2015/0129116 A1 | | 5/2015 | Richeton et al. | |
| 2018/0036970 A1 | | 2/2018 | Chmielewski et al. | |
| 2018/0037695 A1 | * | 2/2018 | Czaplicki | .................. C08J 9/06 |
| 2020/0157293 A1 | | 5/2020 | Chmielewski et al. | |
| 2021/0053625 A1 | | 2/2021 | Richardson | |
| 2021/0237377 A1 | | 8/2021 | Richardson | |
| 2021/0395478 A1 | * | 12/2021 | Czaplicki | ............... C08J 9/0095 |
| 2022/0025172 A1 | | 1/2022 | Czaplicki | |
| 2022/0080912 A1 | | 3/2022 | Barz | |
| 2022/0089859 A1 | | 3/2022 | Czaplicki | |
| 2022/0097776 A1 | | 3/2022 | Royston | |
| 2024/0287246 A1 | | 8/2024 | Czaplicki | |

FOREIGN PATENT DOCUMENTS

| | | | | |
|---|---|---|---|---|
| AU | 2015217504 B2 | * | 2/2017 | ............. C04B 26/06 |
| CN | 108359183 A | | 8/2018 | |
| FR | 2512736 A1 | | 3/1983 | |
| JP | 1998101836 A | | 4/1998 | |
| JP | 2001081223 A | | 3/2001 | |

(Continued)

OTHER PUBLICATIONS

Machine translation of Okada (JP 2003064209 A) (Year: 2003).*
Chinese Office Action dated Apr. 21, 2023, for Chinese Patent Application No. 202080023811.7.
International Search Report dated Jul. 9, 2020, PCT Application No. PCT/US2020/024211.
Japanese 1st Office Action, dated Mar. 2, 2023, for Japanese Application No. 2021-523472.
Japanese 2nd Office Action, dated Nov. 17, 2023, for Japanese Application No. 2021-523472.

*Primary Examiner* — Callie E Shosho
*Assistant Examiner* — Bethany M Miller
(74) *Attorney, Agent, or Firm* — The Dobrusin Law Firm, P.C.

(57) ABSTRACT

The present teachings generally provide a system comprising a pultruded profile and a two-part system with a first component including one or more epoxy resins and a second component including one or more phosphate esters such that mixing the first component and second component forms an activatable material that activates at a temperature of about 0° C. to about 50° C. The activatable material is extruded onto the pultruded profile such that residual heat from pultrusion in the pultruded profile activates the activatable material.

19 Claims, 1 Drawing Sheet

(56) References Cited

FOREIGN PATENT DOCUMENTS

| | | | |
|---|---|---|---|
| JP | 2003064209 A | * | 3/2003 |
| WO | 2016149700 A1 | | 9/2016 |
| WO | 2020/205192 A1 | | 10/2020 |
| WO | 2020/214769 A1 | | 10/2020 |
| WO | 2021/080917 A1 | | 4/2021 |

* cited by examiner

PULTRUSION WITH EXTRUDED GASKET FOAM

FIELD

The present teachings relate generally to a pultrusion with an extruded gasket foam that cures at room temperature. The extruded gasket may generally have a composition with a first component and a second component. More specifically, the present teachings relate to epoxy and phosphate ester-based gasket materials.

BACKGROUND

Gasket materials are frequently employed in the transportation and construction industries for a variety of purposes. For example, gasket materials may provide one or more of structural support, sealing and sound attenuation.

Die-cut gasket materials have been employed in industry, particularly the transportation and construction industries. Typically, die-cut gasket materials comprise foam that is formed before application on a workpiece and attachment to a workpiece is achieved via an adhesive such as a pressure sensitive adhesive. Some drawbacks of die-cut gasket materials include the extra labor and process resources inherent in the die-cutting process, waste produced by die-cutting, and the need for a separate adhesive.

In-place foaming reactions allow gasket materials to be dispensed directly onto the workpiece. Where room-temperature activation (e.g., expansion) is desired, polyurethane-based foams are most common. Polyurethane foams have a number of drawbacks, some of which are inclusion of isocyanate, a limited ability to adhere to certain substrates, poor hydrolysis resistance in wet or humid environments, unsuitability for use in slower reacting systems, high sensitivity to temperature changes during dispensing and foaming, and a need for high specificity in mix ratios when formulating.

As an alternative to polyurethane-based foams, phosphoric acids for in-place foaming reactions in polymeric materials have been utilized. However, phosphoric acid leads to additional concerns. As one example, reaction time with phosphoric acid is very fast which is not ideal for assembly processes that require time to locate the polymeric material onto a surface prior to foaming. Thus, a somewhat delayed reaction time may be preferable. In some situations, the nature of phosphoric acid can have negative health and safety risks. Therefore, alternative materials with a reduced health and safety risk may be preferred. There is also a significant difference in viscosity between the phosphoric acid and the polymeric material. This presents challenges to both manufacturing (e.g., mixing) and storage of the material. Phosphoric acid also has a much lower molecular weight than many polymeric materials, leading to undesirable mix ratios. Relatively similar mix ratios of 1:1 or 2:1 would be preferable. Lastly, the reactive nature of phosphoric acid makes it difficult to formulate adhesive and sealant materials as so many chemical components may be unstable when utilized in conjunction with phosphoric acid. It would be preferable to have the ability to include a variety of different moieties that may be advantageous for adhesion, physical or chemical compatibility, or other reasons.

International Publication No. WO 2016/149700 A1, incorporated by reference herein for all purposes, discloses the use of phosphate esters as an alternative to phosphoric acid.

Notwithstanding the above teachings, there has remained a need for improved gasket materials. There is a need for gasket materials which provide room temperature cure. There is a need for gasket materials which provide for expansion and cross-linking at reduced temperatures as compared to known gasket materials. There is a need for gasket materials which provide adhesion to a wide variety of substrates. There is need for gasket materials which utilize a component capable of both curing and foaming without the need for additional components. There is a need for gasket materials which provide desirable fire, smoke, and toxicity (FST) properties while eliminating the use of undesirable agents for imparting the same.

SUMMARY

The present teachings provide one or more of the above-mentioned benefits. The gasket materials of the present teachings may be utilized for one or more of the following: cavity filling, sealing, reinforcing, or damping. The gasket materials may be extruded. The gasket materials may be extruded onto a pultrusion.

The present teachings provide for a pultruded profile with an activatable material disposed thereon, the activatable material including a two-part system comprising: a first component including one or more epoxy resins; a second component including one or more phosphate esters; and wherein, upon mixing the first component and second component to form a curable composition, the curable composition cures at a temperature of about 0° C. to about 50° C.

The present teachings may provide for an activatable material including a two-part system comprising: a first component including: one or more liquid epoxy resin; one or more flexible epoxy resins; an aliphatic multifunctional epoxy resin; one or more reactive diluents; and one or more first component additives; a second component including: a first phosphate ester; a second phosphate ester; a third phosphate ester; and one or more second component additives; and wherein, upon mixing the first component and second component to form a curable composition, the curable composition cures at a temperature of about 0° C. to about 50° C., wherein the activatable material is a gasket foam that is extruded onto a pultruded profile.

The second component of the activatable material may include three of the one or more phosphate esters.

The second component of the activatable material may include three of the one or more phosphate esters. The one or more phosphate esters may include a phosphate ester derived from cashew nut shell liquid (CNSL). The one or more phosphate esters may include a phosphate ester derived from 2-ethylhexyl glycidyl ether.

The first component of the activatable material may include one or more first component additives. The one or more first component additives may include calcium carbonate, minerals, reinforcing fiber, hydrophobic silica, or any combination thereof. The calcium carbonate may be present in an amount from about 15% to about 25% by weight. The calcium carbonate may include an ultrafine calcium carbonate, a fine calcium carbonate, a medium fine calcium carbonate, or any combination thereof. The first component may include the fine calcium carbonate in an amount from about 4% to about 8% by weight and the medium fine calcium carbonate in an amount from about 13% to about 18% by weight. The composition of any of the preceding claims, wherein the second component may include one or more second component additives. The one or more second component additives may include calcium carbonate, minerals, reinforcing fiber, hydrophobic silica, or any combination thereof.

The one or more epoxy resins may include one or more liquid epoxy resins, one or more flexible epoxy resins, one or more aliphatic multifunctional epoxy resins, one or more reactive diluents, or any combination thereof. The one or more liquid epoxy resins may include a reaction product of epichlorohydrin and bisphenol A. The one or more liquid epoxy resins may be present in an amount from about 6% to about 10% by weight. The one or more flexible epoxy resins may include a di-functional glycidyl ether epoxy resin, an unmodified BPA-based epoxy resin, a multifunctional epoxidized polybutadiene resin, or any combination thereof. The one or more flexible epoxy resins may be present in an amount from about 35% to about 45% by weight. The one or more aliphatic multifunctional epoxy resins may include an epoxidized sorbitol. The one or more aliphatic multifunctional epoxy resins may be present in an amount from about 8% to about 16% by weight. The one or more reactive diluents may include a polyglycol diglycidyl ether, a trimethylolethane triglycidyl either, or both. The one or more reactive diluents may be present in an amount from about 8% to about 16% by weight.

The activatable material may be activated at temperatures from about 10° C. to about 35° C. The activation temperature may be from about 15° C. to about 25° C. Upon activation, the activatable material may cure, foam, expand, seal, adhere, or a combination thereof. The activation time of the activatable material may be from about 5 minutes to about 15 minutes. The activation time of the activatable material may be from about 7 minutes to about 10 minutes. The resulting reaction product may have a volume expansion from about 100% to about 800%. The resulting reaction product may have a volume expansion from about 400% to about 500%.

The activatable composition may be dispensed upon a workpiece consisting of an automobile component. The work piece may be a pultruded profile. The reaction product of the activatable material may be a gasket. The two-part system of the activatable material may be free of curing agents, curing accelerators, or both. Activation of the activatable material may be triggered by the residual heat of the pultruded profile.

A method comprising: pultruding a profile, extruding an activatable material with a two-part system onto the profile, and activating the activatable material on the profile, wherein the two-part system including a first component and a second component, the first component including one or more epoxy resins and the second component including one or more phosphate esters; and mixing the first component and the second component to form a reaction product; and wherein, mixing the first component and second component form the activatable material, wherein the activatable material is activated at a temperature of about 0° C. to about 50° C., and wherein the activatable material is activated by residual heat in the profile from the pultrusion process.

The second component of the two-part system may include three different phosphate esters. The first component of the two-part system may include one or more first component additives. The second component may include one or more second component additives. The one or more first component additives may include calcium carbonate.

Activation may occur at a temperature from about 10° C. to about 35° C. Activation may occur at a temperature of from about 15° C. to about 25° C. A cure time of the activatable material may be from about 5 minutes to about 15 minutes. A cure time of the activatable material may be from about 7 minutes to about 10 minutes. The activatable material may have a volume expansion from about 100% to about 800%. The reaction product may have a volume expansion from about 400% to about 500%.

The activatable material may be dispensed upon a workpiece consisting of an automobile component. The reaction product of the activatable material may be a gasket. The activatable material may be free of curing agents, curing accelerators, or both.

DETAILED DESCRIPTION

The present teachings meet one or more of the above needs by the improved compositions and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide for an activatable material that may be configured for use with a pultrusion. The activatable material may be activated from a selected stimulus. For example, the activatable material may be heat activated by temperatures from about 0° C. to about 50° C. The activatable material may be extruded onto a pultrusion. The pultrusion may be a pultruded profile for use as an automobile component. The pultruded profile may retain some residual heat from the pultrusion process, and, subsequently, the retained heat may be used to activate the activatable material when the activatable material is extruded onto the profile.

The present teachings provide an activatable material that may be a two-part composition comprising an A-side (i.e., "first component") and a B-side (i.e., "second component"). Upon mixing, the two-part composition may form an activatable material, and, upon activation, may form a reaction product, which may be a gasket material.

The A-side may comprise one or more epoxy resins, one or more additives, one or more monomers, or both. The one or more epoxy resins may include one or more liquid epoxy resins, one or more flexible epoxy resins, one or more epoxy phenol novolac resins, one or more aliphatic multifunctional epoxy resins, one or more reactive diluents, one or more phenoxy resins, one or more silane modified epoxy resins, one or more surfactants, one or more monomers, or any combination thereof. The one or more additives may include one or more toughening agents (e.g., core-shell polymer), calcium carbonate, minerals, reinforcing fiber, hydrophobic silica, tabular alumina, or any combination thereof.

The B-side may comprise one or more phosphate esters, phosphoric acid, one or more additives, one or more surfactants, one or more monomers, or any combination thereof. The one or more phosphate esters may include a first phosphate ester, a second phosphate ester, a third phosphate ester, or any combination thereof. The one or more additives may include one or more toughening agents (e.g., core-shell polymer), minerals, reinforcing fiber, hydrophobic silica, tabular alumina, or any combination thereof.

The one or more phosphate esters may be produced by the reaction of phosphoric acid and various alcohols. The one or more phosphate esters may be produced by the reaction of phosphoric acid and an epoxide group of a phosphate ester precursor (i.e., component not yet reacted with phosphoric acid). The one or more phosphate esters may be produced by the reaction of phosphoric acid with the glycidyl ether of cashew nut shell liquid (CNSL) such as that sold under the trade name Cardolite® LITE 2513HP, commercially available from Cardolite Corporation, Monmouth Junction NJ. The one or more phosphate esters may be produced by the reaction of phosphoric acid with a phenyl glycidyl ether such as that sold under the trade name ERISYS® GE-13, commercially available from CVC Thermoset Specialties, Moorestown, NJ. The phosphate ester may be produced by the reaction of phosphoric acid with 2-ethylhexyl glycidyl ether such as that sold under the trade name ERISYS® GE-6, commercially available from CVC Thermoset Specialties, Moorestown, NJ. The one or more phosphate esters may be produced by the reaction of phosphoric acid with an epoxidized para-tertiary butyl phenol such as that sold under the trade name ERISYS® GE-11, commercially available from CVC Thermoset Specialties, Moorestown, NJ.

The cashew nut shell liquid (CNSL) may include chemicals commonly extracted from cashew nut shell liquid (CNSL) including anacardic acids, cardol, cardanol, or any combination thereof. Preferably, the glycidyl ether of the cashew nut shell liquid (CNSL) is a glycidyl ether of cardanol.

The one or more phosphate esters may be selected from mono-esters, di-esters, or tri-esters as shown below:

mono-ester    Di-ester    Tri-ester

The one or more phosphate esters may be obtained from the reaction of epoxide groups with phosphoric acid as depicted below:

Mono-ester

Di-ester

Tri-ester

The B-side may comprise one or more phosphate esters, one or more phosphate ester precursors, or both. The B-side may comprise one or more phosphate ester precursors that may be combined with phosphoric acid prior to combination with the A-side. The B-side may comprise one or more phosphate esters that are pre-reacted (i.e., the epoxide and phosphate reaction) before addition to the B-side.

The first phosphate ester may be the reaction product of phosphoric acid with the glycidyl ether of cashew nut shell liquid (CNSL) such as that sold under the trade name Cardolite® LITE 2513HP, commercially available from Cardolite Corporation, Monmouth Junction NJ. The second phosphate ester may be the reaction product of phosphoric acid with 2-ethylhexyl glycidyl ether such as that sold under the trade name ERISYS® GE-6, commercially available from CVC Thermoset Specialties, Moorestown, NJ.

The first phosphate ester may be present in an amount from about 20% to about 45% by weight of the B-side. The first phosphate ester may be present in an amount from about 25% to about 35% by weight of the B-side. The first phosphate ester may be present in an amount from about 28% to about 32% by weight of the B-side. The first phosphate ester may be present in an amount of about 32% by weight of the B-side. The second phosphate ester may be present in an amount from about 10% to about 30% by weight of the B-side. The second phosphate ester may be present in an amount from about 15% to about 25% by weight of the B-side. The second phosphate ester may be present in an amount from about 18% to about 22% by weight of the B-side. The second phosphate ester may be present in an amount of about 21% by weight of the B-side. The third phosphate ester may be present in an amount from about 30% to about 65% by weight of the B-side. The third phosphate ester may be present in an amount from about 35% to about 45% by weight of the B-side. The third phosphate ester may be present in an amount of about 42% by weight of the B-side. The third phosphate ester may be present in an amount of about 58% by weight of the B-side. The third phosphate ester may be present in an amount of about 60% by weight of the B-side.

The first phosphate ester and the third phosphate ester may be present without the second phosphate ester. The first phosphate ester may be present in an amount from about 25% to about 35% by weight of the B-side. The first phosphate ester may be present in an amount of about 30% by weight of the B-side. The third phosphate ester may be present in an amount from about 55% to about 65% by weight of the B-side. The third phosphate ester may be present in an amount of about 60% by weight of the B-side.

The B-side may include phosphoric acid. The phosphoric acid may be ortho-phosphoric acid, polyphosphoric acid, or both. The phosphoric acid may be polyphosphoric acid. The phosphoric acid may be free acid in the one or more phosphate esters, added independently from the one or more phosphate esters, or both. The addition of phosphoric acid to the B-side may result in increased expansion (e.g., foaming) of the resulting reaction product. The addition of phosphoric acid to the B-side may increase the reactivity of the two-part system to help maintain desired levels of expansion, curing, or both when temperatures are below 23° C.

The independently added phosphoric acid may be in aqueous solution in the amount of 85% or more, or even 95% or more (i.e., "reagent grade"). The independently added phosphoric acid may be present in an amount from about 1% to about 10% by weight of the B-side. The independently added phosphoric acid may be present in an amount from about 2% to about 6% by weight of the B-side. The independently added phosphoric acid may be present in an amount of about 4% by weight of the B-side.

The one or more phosphate esters, produced from the reaction of phosphoric acid and epoxide group containing component, may include free acid. The one or more phosphate esters may have about 1% or more free acid, about 3% or more free acid, about 5% or more free acid, about 15% or less free acid, about 13% or less free acid, or even about 11% or less free acid.

The two-part system, upon addition of the A-side and the B-side, may foam as a result of a reaction of metal carbonate or metal bicarbonate and an acid, generating the release of gas (i.e., chemical expansion). Such a reaction mechanism is described in U.S. Pat. No. 5,648,401, incorporated by reference herein for all purposes.

The curing, foaming, expanding, sealing, adhering, or a combination thereof may occur at a temperature of about 50° C. or less, about 40° C. or less, about 30° C. or less, about 20° C. or less, about 0° C. or more, or even about 10° C. or more. The curing, foaming, expanding, sealing, adhering, or a combination thereof may occur at a temperature from about 10° C. to about 35° C. The curing, foaming, expanding, sealing, adhering, or a combination thereof may occur at a temperature of about 10° C. The curing, foaming, expanding, sealing, adhering, or a combination thereof may occur at room temperature (e.g. at a temperature of about 15° C. to about 25° C.). The curing, foaming, expanding, sealing, adhering, or a combination thereof may occur at a temperature of about 23° C.

The present teachings contemplate a relatively fast activation time as compared to other activatable materials or cure systems that occur without the addition of a stimulus (e.g., at room temperature). The activation time of the reaction product may be 75 minutes or less, 50 minutes or less, 30 minutes or less, 20 minutes or less. The activation time may be about 2 minutes or more, about 8 minutes or more, or even about 16 minutes or more. The activation time of the resulting reaction product may be from about 5 minutes to about 20 minutes. The activation time of the resulting reaction product may be about 10 minutes. The activation time of the resulting reaction product may be about 7 minutes. The activation time of the resulting reaction product may be about 5 minutes.

Foaming may begin before a complete cure of the resulting reaction product. The foaming time (i.e., the time frame within which the two-part system actively foams) of the reaction product may be 30 minutes or less or even 20 minutes or less. The foaming time of the reaction product may be from about 1 minute to about 10 minutes. The foaming time of the reaction product may be about 5 minutes. The foaming time of the reaction product may be about 7 minutes.

The A-side may include one or more epoxy-based materials (i.e., one or more epoxy resins). The one or more epoxy resins may be any conventional dimeric, oligomeric, or polymeric epoxy resin. The one or more epoxy resins may contain at least one epoxide functional group (i.e., monofunctional) or may contain more than one epoxide functional group (i.e., multifunctional). The one or more epoxy resins may contain one or more epoxide functional group, two or more epoxide functional groups, three or more epoxide functional groups, or even four or more epoxide functional groups. The one or more epoxy resins may be modified epoxy resins (e.g., silane modified, elastomer modified, and the like). The one or more epoxy resins may be aliphatic, cycloaliphatic, aromatic, or the like, or any combination thereof. The one or more epoxy resins may be supplied as a solid (e.g., as pellets, chunks, pieces, or the like, or any combination thereof) or a liquid (e.g., a liquid epoxy resin). As used herein, unless otherwise stated, an epoxy resin is a solid if it is solid at a temperature of 23° C. and is a liquid resin if it a liquid at a temperature of 23° C. The one or more epoxy resins may include one or more liquid epoxy resins, one or more flexible epoxy resins, one or more epoxy phenol novolac resins, one or more aliphatic multifunctional epoxy resins, one or more reactive diluents, one or more phenoxy resins, one or more silane modified epoxy resins, or any combination thereof.

The two-part system may include one or more liquid epoxy resins. The one or more liquid epoxy resins may function as a base for the epoxy resin component. The one or more liquid epoxy resins may be a reaction product of epichlorohydrin (hereinafter, "EPH") and any conventional bisphenol. The one or more liquid epoxy resins may be a reaction product of EPH and bisphenol A (hereinafter, "BPA"), bisphenol F (hereinafter, "BPF"), or both. The one or more liquid epoxy resins may have an epoxide equivalent weight (hereinafter "EEW") from about 160 g/equivalent to about 192 g/equivalent as measured according to ASTM D1652-97. The one or more liquid epoxy resins may have an epoxide percentage from about 20 to about 25. The one or more liquid epoxy resins may have a viscosity from about 2,000 cP to about 14,000 cP at 25° C. as measured according to ASTM D445. An example of a suitable BPA-based liquid epoxy resin may be D.E.R.™ 331, commercially available from The Dow Chemical Company (Midland, MI). An example of a suitable BPF-based liquid epoxy resin may be YDF-170 commercially available from Kukdo Chemical (South Korea).

The one or more liquid epoxy resins may be present as a part of the A-side. The one or more liquid epoxy resins may be present in an amount from about 4% to about 15% by weight of the A-side. The one or more liquid epoxy resins may be present in an amount from about 6% to about 10% by weight of the A-side. The one or more liquid epoxy resins may be present in an amount about 8% by weight of the A-side.

The two-part system may include one or more flexible epoxy resins. The one or more flexible epoxy resins may function to reduce the compression modulus, increase strain to failure, decrease time to recover, increase the degree of cross-linking density in the reaction product, increase impact resistance, improve adhesion, improve chemical resistance, or any combination thereof, of the reaction product. The one or more flexible epoxy resins may improve the gas entrapment capability of the two-part system by acting as a viscosity modifier. The one or more flexible epoxy resin may be a di-functional glycidyl ether epoxy resin, an unmodified BPA-based epoxy resin, a multifunctional epoxidized polybutadiene resin, or any combination thereof. The one or more flexible epoxy resins may have an EEW of about 260 to about 500 as measured according to ASTM D1652-97. The one or more flexible epoxy resins may have a viscosity of about 700 cP to about 25,000 cP at 25° C. as measured according to ASTM D445. Examples of suitable flexible epoxy resins may include NC-514 (commercially available from Cardolite Corporation, Monmouth Junction NJ), Araldite® PY 4122 (commercially available from Huntsman Advanced Materials, Inc., Salt Lake City, UT), Poly bd® 605E (commercially available from Cray Valley, Exton, PA), or any combination thereof.

The one or more flexible epoxy resins may be present in the A-side. The one or more flexible epoxy resins may be present in an amount from about 30% to about 50% by weight of the A-side. The one or more flexible epoxy resins may be present in an amount from about 35% to about 45% by weight of the A-side. The one or more flexible epoxy resins may be present in an amount of about 39% by weight of the A-side. The one or more flexible epoxy resins may include a di-functional glycidyl ether epoxy resin in the amount of from about 10% to about 18% by weight of the A-side, an unmodified BPA-based epoxy resin in an amount from about 8% to about 16% by weight of the A-side, and a multifunctional epoxidized polybutadiene resin in an amount from about 8% to about 16% by weight of the A-side. The one or more flexible epoxy resins may include a di-functional glycidyl ether epoxy resin in the amount of about 14% by weight of the A-side, an unmodified BPA-based epoxy resin in an amount of about 12% by weight of the A-side, and a multifunctional epoxidized polybutadiene resin in an amount of about 12% by weight of the A-side. The two-component system may include a di-functional glycidyl ether epoxy resin, a difunctional epoxy derived from cardanol, and a multifunctional epoxidized polybutadiene resin, respectfully in a ratio of about 1:1:1. The two-component system may include a di-functional glycidyl ether epoxy resin, a difunctional epoxy derived from cardanol, and a multifunctional epoxidized polybutadiene resin, respectfully in a ratio of about 1:0.8:0.8. The two-component system may include a di-functional glycidyl ether epoxy resin, a difunctional epoxy derived from cardanol, and a multifunctional epoxidized polybutadiene resin, respectfully in a ratio of about 1:0.9:0.9.

The two-part system described herein may also include one or more epoxy phenol novolac resins. The one or more epoxy phenol novolac resins may function to impart chemical resistance, solvent resistance, temperature resistance, or any combination thereof, to the reaction product. The one or more epoxy phenol novolac resins may be present as a part of the A-side. The one or more epoxy phenol novolac resins may have an EEW from about 165 g/equivalent to about 183 g/equivalent as measured according to ASTM D1652-97. The one or more epoxy phenol novolac resins may have an average epoxy functionality from about 2.6 to about 6.5. The one or more epoxy phenol novolac resins may have a viscosity from about 18,000 cP to about 30,000 cP at 25° C. as measured according to ASTM D445. Examples of suitable epoxy phenol novolac resins may be those sold under the trade names Epalloy 8250 and Epalloy 8330, commercially available from CVC Thermoset Specialties (Moorestown, NJ).

The one or more epoxy phenol novolac resin may be present in an amount from about 30% to about 50% by weight of the A-side. The one or more epoxy phenol novolac resins may be present in an amount of about 35% to about 45% by weight of the first component or A-side. The one or more epoxy phenol novolac resins may be present in an amount of about 38% to about 42% by weight of the A-side. The one or more epoxy phenol novolac resins may be present in an amount of about 42% by weight of the A-side. The one or more epoxy phenol novolac resins may include an about 3.6 functional epoxy phenol novolac resin present in an amount of from about 10% to about 18% by weight of the A-side and an about 6.5 functional epoxy novolac resin present in an amount of from about 22% to about 32% by weight of the A-side. The one or more epoxy phenol novolac resins may include an about 3.6 functional epoxy phenol novolac resin present in an amount of about 15% by weight of the A-side and an about 6.5 functional epoxy novolac resin present in an amount of about 28% by weight of the A-side. The two-part system may include an about 3.6 functional epoxy phenol novolac resin and an about 6.5 functional epoxy phenol novolac resin at a ratio of about 1:2 to about 1:3.

The two-part system may include one or more aliphatic multifunctional epoxy resins. The one or more aliphatic multifunctional epoxy resins may function to increase the degree of cross-linking of the reaction product, increase the chemical resistance of the reaction product, or both. The one or more aliphatic multifunctional epoxy resins may include an epoxidized sorbitol. The one or more aliphatic multifunctional epoxy resins may have an EEW from about 160 g/equivalent to about 195 g/equivalent as measured according to ASTM D1652-97. The one or more aliphatic multifunctional epoxy resins may have a viscosity from about 4,000 cP to about 18,000 cP at 25° C. as measured according to ASTM D445. Examples of suitable aliphatic multifunctional epoxy resins may be those sold under the trade names ERISYS® GE-60 and ERISYS® GE-61, commercially available from CVC Thermoset Specialties (Moorestown, NJ).

The one or more aliphatic multifunctional epoxy resins may be present as a part of the A-side. The one or more aliphatic multifunctional epoxy resins may be present in an amount from about 5% to about 20% by weight of the A-side. The one or more aliphatic multifunctional epoxy resins may be present in an amount from about 8% to about 16% by weight of the A-side. The one or more aliphatic multifunctional epoxy resins may be present in an amount from about 10% to about 14% by weight of the A-side. The one or more aliphatic multifunctional epoxy resins may be present in an amount of about 12% by weight of the A-side.

The two-part system may include one or more reactive diluents. The one or more reactive diluents may function to reduce the overall viscosity of the two-part system, in order to modify the dispensing process or the flow of the two-part system on a workpiece after dispensing, increase the degree of cross-linking of the reaction product, or both. The one or more reactive diluents may be polymeric, whereby the reactive diluent may increase the flexibility of the reaction product; the one or more reactive diluents may be multifunctional, whereby the reactive diluent may promote increased crosslinking and impart chemical resistance on the reaction product; or both. The one or more reactive diluents may include a polyglycol diglycidyl ether, a trimethylolethane triglycidyl ether, or both. The one or more reactive diluents may have an EEW from about 150 g/equivalent to about 170 g/equivalent as measured according to ASTM D1652-97. The one or more reactive diluents may have a viscosity of about 200 cP to about 300 cP at 25° C. as measured according to ASTM D445. An example of a suitable reactive diluents may be those sold under the trade names ERISYS® GE-31 and ERISYS® GE-24, commercially available from CVC Thermoset Specialties (Moorestown, NJ).

The one or more reactive diluents may be present in an amount from about 5% to about 20% by weight of the A-side. The one or more reactive diluents may be present in an amount from about 8% to about 16% by weight of the A-side. The one or more reactive diluents may be present in an amount from about 10% to about 14% by weight of the A-side. The one or more reactive diluents may be present in an amount of about 13% by weight of the A-side. The one or more reactive diluents may include a polyglycol diglycidyl ether present in an amount from about 2% to about 6% by weight of the A-side, and a trimethylolethane triglycidyl either present in an amount from about 6% to about 14% of the A-side. The one or more reactive diluents may include a polyglycol diglycidyl ether present in an amount of about 4% by weight of the A-side, and a trimethylolethane triglycidyl either present in an amount of about 9% of the A-side. The two-part system may include a polyglycol diglycidyl ether and a trimethylolethane triglycidyl ether respectively at a ratio of about 1:2 to about 1:3.

The two-part system may include one or more phenoxy resins (i.e., polyhydroxy ether). The one or more phenoxy resins may function to impart improved adhesion, corrosion resistance, heat resistance, or any combination thereof to the reaction product. The one or more phenoxy resins may be derived from the reaction of BPA and EPH. The one or more phenoxy resins may have terminal hydroxyl groups as well as hydroxyl groups in every repeating polymeric unit. The one or more phenoxy resins may have an EEW from about 202 g/equivalent to about 214 g/equivalent as measured according to ASTM D1652-97. The one or more phenoxy resins may have a viscosity from about 20,000 cP to about 50,000 cP at 25° C. as measured according to ASTM D445. An example of a suitable phenoxy resin may be Phenoxy LER-HB commercially available from Gabriel Chemical (Akron, OH).

The one or more phenoxy resins may be present in an amount from about 5% to about 15% by weight of the A-side. The one or more phenoxy resins may be present in an amount from about 7% to about 12% by weight of the A-side. The one or more phenoxy resins may be present in an amount of about 10% by weight of the A-side.

The two-part system may include one or more silane modified epoxy resins. The one or more silane modified epoxy resins may function to impart improved adhesion to the reaction product, particularly adhesion to glass, metals, or both. An example of a suitable silane modified epoxy resin may be that sold under the trade name EPOKUKDO® KSR-177 commercially available from Kukdo Chemical (South Korea).

The one or more silane modified epoxy resins may be present in the A-side. The one or more silane modified epoxy resins may be present in an amount of about 1% to about 7% by weight of the A-side. The one or more silane modified epoxy resins may be present in an amount of about 2% to about 6% by weight of the A-side. The one or more silane modified epoxy resins may be present in an amount of about 4% by weight of the A-side.

The two-part system may include one or more surfactants. The one or more surfactants may function as an emulsifier. The one or more surfactants may include a hydrophobic moiety and a hydrophilic moiety. The one or more surfactants may have an acid number of about 85 to about 100 when measured at a pH of about 5.5 and an acid number of about 160 to about 180 when measured at a pH of about 9.5. The one or more surfactants may have a viscosity of about 32,500 cP to about 42,500 cP at 25° C. as measured according to ASTM D445. The one or more surfactants may be a nonyl phenol ethoxylated phosphate ester, whereby the nonyl moiety is the hydrophobic moiety and the ethoxylated phosphate ester moiety is the hydrophilic moiety. An example of a suitable surfactant may be that sold under the trade name Dextrol™ OC-110 commercially available from Ashland, Inc. (Covington, KY).

The one or more surfactants may be present in the B-side. The one or more surfactants may be present in an amount of about 6% to about 18% by weight of the B-side. The one or more surfactants may be present in an amount of about 8% to about 16% by weight of the B-side. The one or more surfactants may be present in an amount of about 10% to about 14% by weight of the B-side. The one or more surfactants may be present in an amount of about 12% by weight of the B-side.

The two-part system may include one or more monomers. The one or more monomers may function to improve adhesion properties of the reaction product, particularly to metal substrates, increase flexibility of the reaction product, increase impact resistance of the reaction product, or any combination thereof. The one or more monomers may be monofunctional, bifunctional, or even polyfunctional. The one or monomers may be an esterification reaction product of an alcohol and acrylic acid or methacrylic acid. The one or more monomers may be a monofunctional acrylic monomer. Preferably, the one or more monomers may be a mixture of methacrylate acid ester and 2-(2-ethoxyethoxy) ethyl acrylate. An example of a suitable monomer may be that sold under the trade name SR 9050 commercially available from Sartomer (Exton, PA).

The two-part system may include one or more monomers in the A-side, the B-side, or both. The one or more monomers may be present in an amount of about 10% to about 26% by weight of the A-side, B-side, or both the A-side and B-side in combination. The one or more monomers may be present in an amount of about 12% to about 24% by weight of the A-side, B-side, or both the A-side and B-side in combination. The one or more monomers may be present in an amount of about 14% to about 22% by weight of the A-side, B-side, or both the A-side and B-side in combination. The one or more monomers may be present in an amount of about 18% by weight of the A-side, B-side, or both the A-side and B-side in combination.

The rate of cure, the degree of crosslinking, or both may be a function of the functionality of the two-part system (A-side and B-side). A higher functionality (i.e., number of functional groups on one or more polymerizable components) may be desired for a two-part system having prepolymerized components that are shorter in polymer length (i.e., higher melt flow index, "MFI"); whereby the lack of structural backbone resulting from shorter polymers is compensated by a higher degree of crosslinking. A lower functionality may be desired for a two-part system having pre-polymerized components that are longer in length (i.e., lower MFI); whereby the presence of more structural backbone resulting from longer polymers precludes the need for high functionality.

The B-side may at least partially be formed as a salt utilizing at least some of the phosphoric acid and the phosphate esters and as a result, the functionality of the B-side may be reduced. The A-side may include components with increased functionality in order to compensate for a reduced functionality of the B-side. The A-side may be formulated with increased functionality by creating a polymer matrix with functionality higher than two.

The two-part system may include one or more additives. The one or more additives may include one or more toughening agents, calcium carbonate, minerals, reinforcing fiber, hydrophobic silica, tabular alumina, or any combination thereof.

The two-part system may include one or more toughening agents. The one or more toughening agents may function to distribute energy within the reaction product (i.e., increase impact resistance). The one or more toughening agents may contribute to an increased T-Peel strength. The one or more toughening agents may comprise thermoplastics, thermosets or thermosettables, elastomers, the like, or any combination thereof. The one or more toughening agents may include elastomers (including elastomer containing materials), core-shell polymers (which may include but are not limited to elastomers), or both.

The core-shell polymers may comprise a first polymeric material (i.e., core material) and a second polymeric material (i.e., shell material). The first polymeric material may be entirely encapsulated by the second polymeric material. The core-shell polymer may include a first polymeric material in the amount of about 30% or more, 50% or more, or even 70% or more by weight. The first polymeric material, the second polymeric material, or both may comprise one, two, three, or even more than three polymers that are combined together, reacted together (e.g., sequentially polymerized), or both, or may be part of separate or the same core-shell polymer systems. An example of a suitable core-shell polymer may be that sold under the trade name Kane Ace™ MX-267 commercially available from Kaneka North America LLC (Pasadena, TX).

The core-shell polymer may be present in an amount from about 1% to about 10% by weight of the A-side, B-side, or both the A-side and B-side in combination (e.g., if present in the amount of 10% by weight then it may be present in an amount of 5% in the A-side and 5% in the B-side). The core-shell polymer may be present in an amount from about 2% to about 8% by weight of the A-side, B-side, or both the A-side and B-side in combination. The core-shell polymer may be present in an amount from about 4% to about 6% by weight of the A-side, B-side, or both the A-side and B-side in combination. The core-shell polymer may be present in an amount of about 5% by weight of the A-side, B-side, or both the A-side and B-side in combination.

The two-part system may include one or more metal carbonates. The one or more metal carbonates may function to produce gas in the presence of an acid, act as a filler, control the onset or total extent of the foaming (e.g., expansion) process, or both. The one or more metal carbonates may be metal carbonate or metal bicarbonate. Examples of suitable fillers ay include calcium carbonate, nickel carbonate, barium carbonate, sodium bicarbonate, and potassium bicarbonate. Preferably the one or more metal carbonates may include calcium carbonate. The particle size of the metal carbonate, metal bicarbonate, or both may control the expansion and cure of the two-part system, whereby the total surface area of metal carbonate, metal bicarbonate, or both, available to react with the acid is a function of both the particle size of the metal carbonate, bicarbonate, or both, and the amount present in the two-part system.

The calcium carbonate ($CaCO_3$) may be present as one or more calcium carbonate fillers. The one or more calcium carbonate fillers may have a median particle size of from about 1 to about 50 microns. The calcium carbonate may be a medium fine particle size. For example, the median particle size of the medium fine calcium carbonate may be about 22 microns. An example of a suitable medium fine calcium carbonate may be Hubercarb® Q200, commercially available from Huber Engineered Materials, Atlanta, GA. The calcium carbonate may be a fine particle size. For example, the median particle size of the fine calcium carbonate may be about 4 microns. An example of a suitable fine calcium carbonate may be Hubercarb® Q4, commercially available from Huber Engineered Materials, Atlanta, GA. The calcium carbonate may be ultra-fine particle size. For example, the median particle size of the ultra-fine calcium carbonate may be about 1 micron. An example of a suitable ultra-fine calcium carbonate may be Hubercarb® Q1, commercially available from Huber Engineered Materials, Atlanta, GA. The two-part system may include medium fine calcium carbonate, fine calcium carbonate, ultra-fine calcium carbonate, or any combination thereof.

The calcium carbonate may be present in an amount from about 1% to about 25% by weight of the A-side. The calcium carbonate may be present in an amount from about 4% to about 18% by weight of the A-side. The calcium carbonate may be present in an amount from about 8% to about 12% by weight of the A-side. The calcium carbonate may be present in an amount of about 20% by weight of the A-side. The calcium carbonate may include both a fine calcium carbonate present in an amount from about 4% to about 8% by weight of the A-side and a medium fine calcium carbonate present in an amount from about 13% to about 18% by weight of the A-side. The calcium carbonate may include both a fine calcium carbonate present in an amount of about 6% by weight of the A-side and a medium fine calcium carbonate present in an amount of about 15% by weight of the A-side. The calcium carbonate may include both a fine calcium carbonate present in an amount of about 5% by weight of the A-side and a medium fine calcium carbonate present in an amount of about 5% by weight of the A-side. A ratio of a medium fine calcium carbonate to a fine calcium carbonate may be about 3:1 to about 1:3. A ratio of medium fine calcium carbonate to a fine calcium carbonate may be about 1:1.

The calcium carbonate may include a coating. The coating may be any material that breaks down during the activation process, expansion process, or both, so that expansion is delayed, slowed, or both. The coating may be a wax, a fatty acid, or combinations thereof.

The two-part system may include one or more minerals. The one or more minerals (i.e., "mineral reinforcement") may function to structurally reinforce the reaction product. The one or more minerals may improve tensile strength, the flexural strength, or both of the reaction product. The one or more minerals may be any suitable silicate minerals including but not limited to inosilicates (e.g., Wollastonite) and phyllosilicates (e.g., Kaolinite, Vermiculite, Talc, Muscovite, etc.). The characteristic external shape of an individual crystal or crystal group of the one or more minerals may be acicular or needle-like. The median particle size of the one or more minerals may be from about 10 microns to about 20 microns. The median particle size may be from about 12 microns to about 18 microns.

The one or more minerals may include Wollastonite (CaSiO₃). The Wollastonite may be relatively pure (i.e., less than 2% by weight of impurities such as other metal oxides). The Wollastonite may contain impurities including one or more oxides of iron, magnesium, manganese, aluminum, potassium, sodium, or strontium substituting for calcium in the mineral structure. Examples of suitable Wollastonite may be that sold under the trade names NYGLOS® 12 and NYGLOS® 8 commercially available from NYCO Minerals Inc. (Willsboro, NY).

The one or more minerals may be present as part of the A-side, the B-side, or both. The Wollastonite may be present in an amount from about 1% to about 10% by weight of the A-side, B-side, or both the A-side and B-side in combination. The Wollastonite may be present in an amount from about 3% to about 7% by weight of the A-side, B-side, or both the A-side and B-side in combination. The Wollastonite may be present in an amount of about 4% by weight of the A-side, B-side, or both the A-side and B-side in combination.

The one or more minerals may be modified. For example, the one or more minerals may include Kaolinite (i.e., "kaolin clay") that has been calcined (i.e., fired at high temperatures in order to desiccate). The two-part system may include calcined kaolin clay. The calcined kaolin clay may stimulate the foaming (e.g., expansion) process. The calcined kaolin clay may have an average particle size of 1.3 microns, as measured via average stokes equivalent diameter. The calcined kaolin clay may have an average particle size of 3.2 microns, as measured via median Malvern laser. An example of a suitable calcined kaolin clay may be that sold under the trade name KaMin® 70C commercially available from KaMin® LLC (Macon, GA).

The calcined kaolin clay may be present as a part of the A-side, the B-side, or both. The calcined kaolin clay may be present in an amount from about 0.25% to about 5% by weight of the A-side, B-side, or both the A-side and B-side in combination. The calcined kaolin clay may be present in an amount from about 1% to about 4% by weight of the A-side, B-side, or both the A-side and B-side in combination. The calcined kaolin clay may be present in an amount of about 2% by weight A-side, B-side, or both the A-side and B-side in combination.

The two-part system may include one or more reinforcing fibers. The reinforcing fiber may function to structurally reinforce the reaction product. The one or more reinforcing fibers may improve tensile strength, flexural strength, or both of the reaction product. The one or more reinforcing fibers may be present in the A-side, the B-side, or both. The one or more reinforcing fibers may be dispersed homogenously within the A-side, the B-side, or both. The one or more reinforcing fibers may comprise polymeric fibers, glass fibers (i.e., fiberglass), or both. Polymeric fibers may include nylon, polyamide, polyester, polypropylene, polyethylene, polytetrafluoroethylene, aramid fibers (e.g., Kevlar®), the like, or any combination thereof. The glass fibers may include alumino-borosilicate glass ("E-glass"), alkali-lime glass ("A-glass" or "C-glass"), electrical/chemical resistance glass ("E-CR-glass"), borosilicate glass ("D-glass"), alumino-silicate glass ("R-glass" or "S-glass"), or any combination thereof. The reinforcing fiber may be chopped fiber. The reinforcing fiber may be a chopped length of about 0.1 cm or more, about 0.3 cm or more, or even about 0.6 cm or more. The reinforcing fiber may be a chopped length of about 2.0 cm or less, about 1.5 cm or less, or even about 1.0 cm or less. Examples of suitable fiberglass may be chopped strands commercially available from Jushi USA (Columbia, SC).

The reinforcing fiber may be present in the amount from about 0.01% by weight to about 3% by weight of the A-side, B-side, or both the A-side and B-side in combination. The reinforcing fiber may be present in the amount from about 0.1% by weight to about 1% by weight A-side, B-side, or both the A-side and B-side in combination. The reinforcing fiber may be present in the amount of about 0.2% by weight A-side, B-side, or both the A-side and B-side in combination.

The two-part system may include hydrophobic silica. The hydrophobic silica may function to control viscosity (e.g., thicken), control thixotropy, boost hydrophobia, or a combination thereof. The hydrophobic silica may be fumed silica. The hydrophobic silica may be surface treated. For example, the hydrophobic silica may be fumed silica surface-treated with polydimethylsiloxane (hereinafter "PDMS") or hexamethyldisilazane (hereinafter "HMDZ"). The hydrophobic silica may be present as part of the A-side, the B-side, or both. Examples of suitable hydrophobic silica may be that sold under the trade name AEROSIL® R 202 commercially available from Evonik Corporation (Parsippany, NJ); and those sold under the trade name CAB-O-SIL® TS-530 and TS-720 commercially available from Cabot Corporation (Boston, MA).

The hydrophobic silica may be present in an amount of about 0.25% to about 6% by weight of the A-side, B-side, or both the A-side and B-side in combination. The hydrophobic silica may be present in an amount of about 0.5% to about 4% by weight of the A-side, B-side, or both the A-side and B-side in combination. The hydrophobic silica may be present in an amount from about 1% to about 2% by weight of the A-side, B-side, or both the A-side and B-side in combination. The hydrophobic silica may be present in an amount from about 0.5 to about 2%% by weight of the A-side. The hydrophobic silica may be present in an amount from about 3% to about 5% by weight of the B-Side. The ratio of hydrophobic silica in the A-side to the B-side may be from about 1:6 to about 6:1. The ratio of hydrophobic silica in the A-side to the B-side may be about 1:4. The ratio of hydrophobic silica in the A-side to the B-side may be about 1:2 to about 2:1.

The two-part system may include tabular alumina. The tabular alumina may function to impart hardness, resistance to thermal shock, resistance to mechanical shock, high heat capacity, high electrical resistance, or any combination thereof, to the reaction product. The tabular alumina may be present in the A-side, the B-side, or both. The tabular alumina may be alpha alumina converted to its corundum form (i.e., crystalline aluminum oxide) and sintered and may be provided as graded granules or powders. The tabular alumina may be graded (i.e., separated by size) from about 44 microns to about 4760 microns. The tabular alumina may be graded to about 44 microns.

The tabular alumina may be present in an amount from about 5% to about 20% by weight A-side, B-side, or both the A-side and B-side in combination. The tabular alumina may be present in an amount from about 7% to about 18% by weight A-side, B-side, or both the A-side and B-side in combination. The tabular alumina may be present in an amount of about 10% by weight A-side, B-side, or both the A-side and B-side in combination.

The two-part system may include one or more functional additives for improving one or more various properties of the composition. Examples of suitable functional additives may include antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids, stabilizers, the like, and any combination thereof.

The viscosity of the A-side, the B-side, or both may be high enough at about 23° C. in order to preclude the two-part system from undesirably flowing into areas adjacent the dispensed bead upon dispensing the two-part system on a workpiece or to control flow (i.e., permit a desired amount of flow) into areas adjacent the dispensed bead upon dispensing the two-part system. The viscosity of the A-side, B-side, or both, needed to preclude undesirable flow or control flow may depend on the size of the bead dispensed. For example, the thicker the bead of the two-part system dispensed, the higher the viscosity needed to preclude unintended flow or control flow. The viscosity of the A-side at 23° C. may be from about 20,000 cP to about 50,000 cP or even from about 35,000 cP to about 45,000 cP. The viscosity of the A-side at 10° C. may be from about 280,000 cP to about 350,000 cP or even from about 300,000 cP to about 325,000 cP. The viscosity of the B-side at 23° C. may be from about 20,000 cP to about 50,000 cP or even from about 35,000 cP to about 45,000 cP. The viscosity of the B-side at 10° C. may be from about 130,000 cP to about 220,000 cP or even from about 175,000 cP to about 195,000 cP.

The two-part system may expand, upon mixing the A-side and B-side, more than about 50%, more than about 100%, more than about 200%, less than about 800%, less than about 700%, or even less than about 600% the two-part system's original volume. The two-part system may expand from about 400% to about 500% the two-part system's original volume. The two-part system may expand about 400% the two-part system's original volume.

The two-part system may be free of curing agents (i.e., typical curing agents), curing accelerators, or both. Typical curing agents include lewis bases (i.e., anionic catalysts), lewis acids (i.e., cationic catalysts), UV catalysts, amines, anhydrides, phenols, thiols, or any combination thereof. In place of the aforementioned curing agents, the two-part system may cure upon a polymerization reaction, catalyzed by phosphoric acid, between phosphate esters and epoxide groups, hydroxy groups, or both. The two-part system may be both cured and caused to expand by the chemical interaction between phosphate ester and calcium carbonate. It has been found that utilizing the cure and expansion system of the present disclosure may reduce the complexity of formulations by reducing the number of overall components (i.e., curing agents, curing accelerators, and blowing agents); however, the achievement of a desired expansion and time to cure is made more challenging to optimize.

In one non-limiting embodiment of the present teachings, the two-part system may include one or more of the following in the A-side ("first component"): liquid epoxy resin, flexible epoxy resin, aliphatic multifunctional epoxy resin, reactive diluent, aramid fiber, medium fine calcium carbonate, fine calcium carbonate, hydrophobic silica, and Wollastonite. The two-part system may include one or more of the following in the B-side ("second component"): a first phosphate ester, a second phosphate ester, a third phosphate ester, an aramid fiber, and hydrophobic silica.

The two-part system may be mixed together at a ratio from 1:4 to 4:1, A-side to B-side. The two-part system may be mixed together at a ratio from 1:2 to 2:1, A-side to B-side. The two-part system may be mixed together at a ratio of 1:1, A-side to B-side. The two-part system may be mixed together at a ratio of 2:1, A-side to B-side.

Two non-limiting example formulations in accordance with the present teachings is provided below in Table 1.

TABLE 1

|  | Weight % | Weight % |
|---|---|---|
| First Component (A-Side) | | |
| Liquid epoxy resin | 6.0-10.0 | 6.0-10.0 |
| Flexible epoxy resin | 35.0-45.0 | 35.0-45.0 |
| Aliphatic multifunctional epoxy resin | 8.0-16.0 | 8.0-16.0 |
| Reactive diluent | 8.0-16.0 | 8.0-16.0 |
| Aramid fiber | 0.1-1.0 | 0.1-1.0 |
| Calcium carbonate (medium fine) | 13.0-18.0 | 13.0-18.0 |
| Calcium carbonate (fine) | 4.0-8.0 | 4.0-8.0 |
| Fumed silica | 0.5-2.0 | 0.5-2.0 |
| Wollastonite | 3.0-7.0 | 3.0-7.0 |
| Second Component (B-Side) | | |
| First phosphate ester | 25.0-35.0 | 25.0-35.0 |
| Second phosphate ester | 15.0-25.0 | 0.0 |
| Third phosphate ester | 35.0-45.0 | 55.0-65.0 |
| Aramid fiber | 0.1-1.0 | 0.1-1.0 |
| Fumed silica | 3.0-5.0 | 3.0-5.0 |

Table 2 provides the technical data of a formulation in accordance with the present teachings at a cure temperature of 23° C. "Peak exotherm" may refer to the peak temperature reached upon curing and may be a function of both degree of cross-linking and rate of cure; a higher degree of cross-linking may yield a higher exothermic reaction; a higher rate of cure may yield a higher peak exotherm as the reaction product takes on heat from the exothermic reaction faster than it sheds heat. The mechanical properties were determined according to ASTM D1621. Test samples were compressed to 50% of the dimension of the cubes. The crosshead movement rate was kept constant at 12.7 mm/min.

TABLE 2

| Physical Characteristics | |
|---|---|
| Appearance | Light cream paste |
| Mix Ratio by Volume | 2:1 |
| Temperature Tested | 23° C. |
| Time to Expand (sec) | 30 |
| Expansion (%) | 350 |
| Cure Time (min) | 8 |
| Cured Specific Gravity (g/cm$^3$) | 0.30 |
| Peak Exotherm (° C.) | 110 |
| Mechanical Properties | |
| Peak Stress (kPa) | 36 |
| Peak Load (N) | 22 |
| Modulus (kPa) | 100 |
| Strain at Peak (%) | 33 |
| Stress at Yield (kPa) | 23 |
| Time to recover 100% after 1 week at 50% compression at 23° C. (min) | 2 |

Additional examples of formulations in accordance of the present teachings are provided below in Table 3.

TABLE 3

| First Component (A-Side) | Ex1 |
|---|---|
| Liquid epoxy resin DER331 | 9.0 |
| DGEBF Cardolite NC-514 | 14.3 |
| Epoxidized sorbitol Erisys GE-60 | 12.3 |
| Unmodified epoxy resin Araldite PY 4122 | 12.5 |
| Hydroxyl-terminated epoxidized polybutadienes Poly bd 605E | 12.5 |

TABLE 3-continued

| First Component (A-Side) | Ex1 |
|---|---|
| Aliphatic polyglycol diepoxide Erisys GE-24 | 4.0 |
| Trimethylolethane Triglycidyl Ether Erisys GE-31 | 9.0 |
| Aramid fiber Kevlar ® | 0.5 |
| Calcium carbonate (medium fine ground) Q 200 | 15.0 |
| Calcium carbonate (fine particle size) Q 4 | 6.0 |
| Fumed silica Acrosil R 202 | 1.0 |
| Wollastonite Nyglos 8 | 4.0 |
| TOTAL | 100.0 |
| First phosphate acid ester Erisys GE-6/$H_3PO_4$ | 21.2 |
| Second phosphate acid ester | 42.5 |
| Third phosphate acid ester LTE 2513HP/$H_3PO_4$ | 31.8 |
| Aramid fiber Kevlar ® | 0.2 |
| Fumed silica Aerosil R 202 | 4.2 |
| TOTAL | 100.0 |

Table 4 provides the technical data of the formulations in accordance with Table 3 at a cure temperature of 23° C. The compression modulus may be a function of the compressive stress (force per unit area) applied to a sample and the resulting compression (deformation). Thus, a higher compression modulus is desired. Given two samples with uniform compression modulus, a sample having a lower density indicates the matrix of the reaction product is stronger, which may be a product of a higher degree of cross-linking. When observed as a ratio of density to compression modulus, a lower ratio may indicate an overall stronger matrix of the reaction product. The sample designated "gasket" may be a conventional, pre-foamed gasket. Compressive properties were determined according to ASTM D1621 using 25.4 mm cubes. Test samples were compressed to 50% of the dimension of the cubes. The crosshead movement rate was kept constant at 12.7 mm/min.

TABLE 4

| A-Side & B-Side | Gasket | Ex1 | Ex2 | Ex3 | Ex4 | Ex5 | Ex6 | Ex7 | Ex8 | Ex9 |
|---|---|---|---|---|---|---|---|---|---|---|
| Density (g/cm³) | 0.46 | 0.34 | 0.34 | 0.40 | 0.30 | 0.27 | 0.30 | 0.28 | 0.28 | 0.32 |
| Compression Modulus (kPa) | 170 | 247 | 164 | 216 | 236 | 305 | 173 | 103 | 96 | 328 |
| Ratio | 0.0027 | 0.0014 | 0.0021 | 0.0019 | 0.0013 | 0.0009 | 0.0017 | 0.0027 | 0.0029 | 0.0010 |

The two-part system may be provided as side-by-side cartridges, pails, or drums. The two-part system may be mixed prior to application on a workpiece. The two-part system may be applied to a workpiece via any suitable dispenser by which the two-part system is mixed before application on the workpiece. For example, the two-part system may be dispensed onto a workpiece via a static mixer that is configured to deliver a mixed curable composition that has a suitable mix ratio, as described herein.

The resulting reaction product provides excellent adhesion to many substrates along with a fast cure time. The resulting reaction product may provide excellent adhesion to glass, metal, polymer (e.g., thermoplastics, thermosets or thermosettables, or elastomers) or any combination thereof. Particularly, the reaction product provides excellent adhesion to thermoplastics.

The activatable material may be activated before or after full assembly of one or more profiles upon which the two-part system is applied. For example, the activatable material may be dispensed upon a first profile, activated, and then a second profile that is complementary to the first profile may be applied upon the first profile. As another example, the activatable material may be dispensed upon a first profile and a second profile complementary to the first profile may be applied upon the first profile, and then the activatable material may be activated. An activatable material that cures and/or expands after the full assembly of the profile may expand to fill a space between a first profile and a second profile. The first profile, the second profile, or both may include grooves in which the two-part system is dispensed in, expands in, or both.

Figure 1:
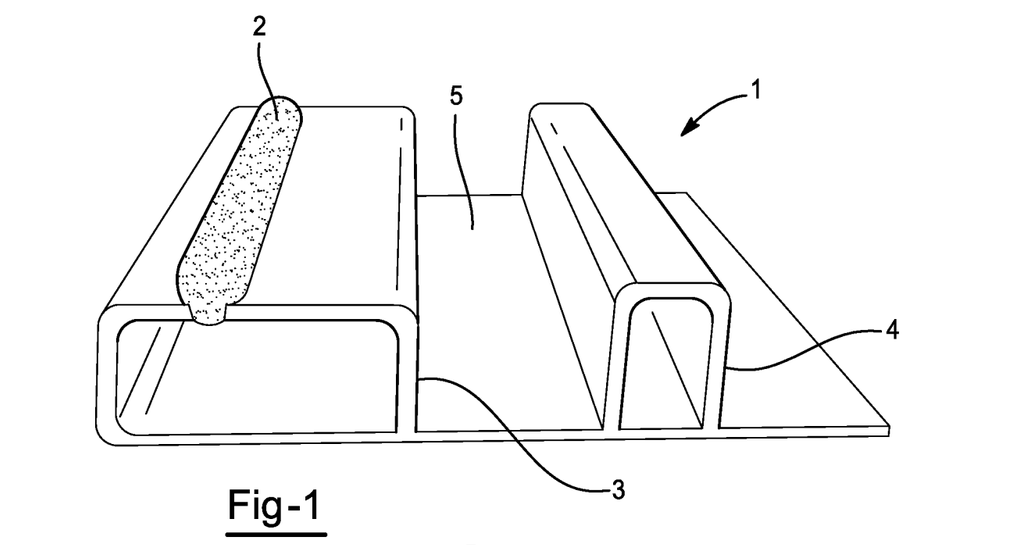
FIG. 1 is a perspective view of a pultruded part with extruded gasket foam
Figure 2:
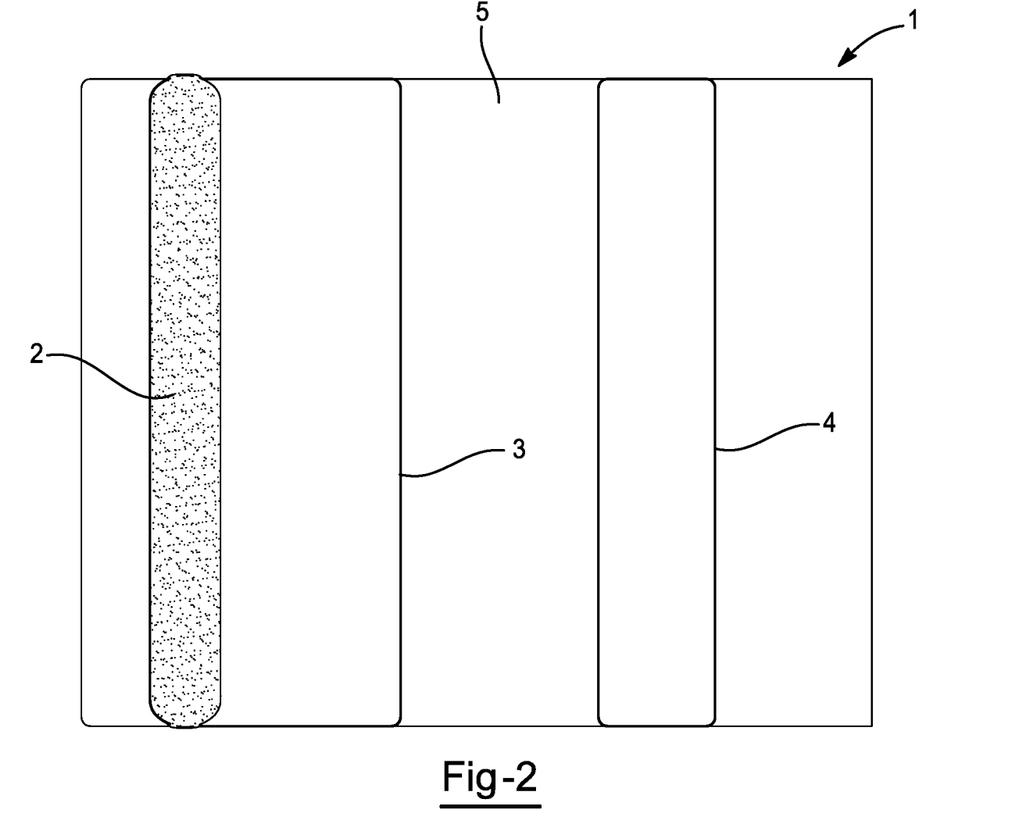
FIG. 2 is another view of a pultruded part with extruded gasket foam.

The one or more profiles may be pultruded. The one or more profiles may be any size or shape capable of being pultruded. Pultrusion is a method of creating composite structures by impregnating a reinforcing fiber with resin and then pulling the reinforced fibers through a heated stationary die where the resin undergoes polymerization. The one or more profiles may have any suitable cross-section. The one or more profiles may have a continuous shape. The one or more profiles may have a shape that varies along a longitudinal axis, a transverse axis, vertical axis, or a combination thereof. In FIGS. 1 and 2, the pultruded profile 1 is shown having a large rectangular cross-sectional portion 3 and a smaller rectangular cross-sectional portion 4 connected by a horizontal plane 5.

The activatable material may be applied to the one or more profiles after the one or more profiles have been pultruded. The activatable material may be placed in an extruder and subsequently extruded onto the one or more pultruded profiles as the profiles are exiting the pultrusion die. The activatable material may be extruded onto the one or more pultruded profiles as an in-line process, so as to reduce the number of steps required for manufacturing. Pultrusion requires a heating step while forming the one or more profiles. The residual heat put into the pultruded profiles is sufficient to activate the activatable material once the activatable material is extruded onto the pultruded profile. Because the pultruded profile maintains some of the heat from the forming process, the time needed for the activatable material to expand and cure is reduced. As can be seen in FIGS. 1 and 2 the pultruded profile 1 has activatable material 2 disposed along the large rectangular cross-sectional portion 3. The activatable material may be located on any part of the pultruded profile. The activatable material may substantially cover the profile. The activatable material may be selectively positioned on the profile.

The two-part system may be utilized in transportation applications. The two-part system may be utilized in automotive applications. The two-part system may be utilized in applications including but not limited to vehicle interiors, vehicle exteriors, HVAC ducts, side mirrors, electronics enclosures, tail lamps, head lamps, or the like.

The present teachings provide a method that may comprise: providing a two-part system, the two-part system including an A-side (i.e., first component) and a B-side (i.e., second component). The A-side including one or more epoxy resins and the B-side including one or more phosphate esters and optionally phosphoric acid. The A-side and the B-side may be mixed to form a curable composition. The method may include a step of curing the curable composition of the at a temperature of less than 50° C., thereby forming a reaction product. The method may comprise a step of mixing the first component and the second component to form a reaction prod. The method may comprise a step of wherein the reaction product of the first component and the second component cures at a temperature of less than 50° C. The method may be employed with an A-side that includes one or more epoxy resins, calcium carbonate, or both. The method may be employed with a B-side that includes one or more phosphate esters, phosphoric acid, or both. The method may be employed with and A-side, a B-side, or both having one or more additives.

Use of the teachings herein may result in a gasket that exhibits sufficient flame retardancy to meet one or more of the requirements for demonstrating flame retardancy (e.g., to meet vertical burn and/or smoke density requirements (or some other requirement) as set forth in 14 C.F.R. § 25.853 and 14 C.F.R. § 25.856 (the United States Code of Federal Regulations for compartment interiors, including but not limited to 14 C.F.R. § 25.853(a), and the referenced Appendix F and procedures referenced therein), all of which are incorporated by reference for all purposes.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A system comprising:
   (a) a pultruded profile; and
   (b) a two-part system comprising:
      (1) a first component including one or more epoxy resins;
      (2) a second component including one or more phosphate esters; and
   wherein, mixing the first component and second component forms an activatable material that activates at a temperature of about 0° C. to about 50° C.;
   wherein the activatable material is extruded onto the pultruded profile such that residual heat from pultrusion in the pultruded profile is capable of activating the activatable material, and
   wherein a reaction product of the activatable material is a gasket.

2. The system of claim 1, wherein the second component includes three of the one or more phosphate esters.

3. The system of claim 1, wherein the one or more phosphate esters includes a phosphate ester derived from cashew nut shell liquid (CNSL).

4. The system of claim 1, wherein the one or more phosphate esters includes a phosphate ester derived from 2-ethylhexyl glycidyl ether.

5. The system of claim 1, wherein the first component includes one or more first component additives.

6. The system of claim 5, wherein the one or more first component additives includes calcium carbonate, minerals, reinforcing fiber, hydrophobic silica, or any combination thereof.

7. The system of claim 6, wherein the first component includes the calcium carbonate, and wherein the calcium carbonate is present in an amount from about 15% to about 25% by weight of the first component.

8. The system of claim 7, wherein the calcium carbonate has a median particle size of from about 1 micron to about 50 microns.

9. The system of claim 8, wherein the first component includes fine calcium carbonate having a median particle size of about 4 microns in an amount from about 4% to about 8% by weight and medium fine calcium carbonate having a median particle size of about 22 microns in an amount from about 13% to about 18% by weight.

10. The system of claim 5, wherein the second component includes one or more second component additives.

11. The system of claim 10, wherein the one or more second component additives includes: minerals, reinforcing fiber, hydrophobic silica, or any combination thereof.

12. The system of claim 1, wherein the one or more epoxy resins include one or more liquid epoxy resins, one or more flexible epoxy resins, one or more aliphatic multifunctional epoxy resins, one or more reactive diluents, or any combination thereof.

13. The system of claim 12, wherein the one or more liquid epoxy resins includes a reaction product of epichlorohydrin and bisphenol A.

14. The system of claim 13, wherein the one or more liquid epoxy resins are present in an amount from about 6% to about 10% by weight of the first component.

15. The system of claim 12, wherein the one or more epoxy resins include the one or more flexible epoxy resins, and wherein the one or more flexible epoxy resins include a di-functional glycidyl ether epoxy resin, an unmodified BPA-based epoxy resin, a multifunctional epoxidized polybutadiene resin, or any combination thereof.

16. The system of claim 12, wherein the one or more epoxy resins include the one or more flexible epoxy resins, and wherein the one or more flexible epoxy resins are present in an amount from about 35% to about 45% by weight of the first component.

17. The system of claim 12, wherein the one or more epoxy resins include the one or more aliphatic multifunctional epoxy resins, and wherein the one or more aliphatic multifunctional epoxy resins include an epoxidized sorbitol.

18. The system of claim 1, wherein the two-part system is free of curing agents, curing accelerators, or both.

19. The system of claim 1, wherein the two-part system includes one or more metal carbonates or metal bicarbonates.

* * * * *